United States Patent
Fukuda et al.

(10) Patent No.: US 6,755,930 B2
(45) Date of Patent: Jun. 29, 2004

(54) METHOD AND APPARATUS FOR ATTACHING SEPARATOR TO ELECTRODE PLATE

(75) Inventors: Shinsuke Fukuda, Moriguchi (JP); Mitsugu Takaki, Toyohashi (JP); Yoshihiro Bouki, Fujisawa (JP)

(73) Assignees: Matsushita Electric Industrial Co., Ltd., Osaka (JP); Toyota Jidosha Kabushiki Kaisha, Toyota (JP)

( * ) Notice: Subject to any disclaimer, the term of this patent is extended or adjusted under 35 U.S.C. 154(b) by 14 days.

(21) Appl. No.: 10/087,794

(22) Filed: Mar. 5, 2002

(65) Prior Publication Data

US 2002/0124949 A1 Sep. 12, 2002

(30) Foreign Application Priority Data

Mar. 6, 2001 (JP) .......................... 2001-061790

(51) Int. Cl.[7] ............................................. B32B 31/00
(52) U.S. Cl. ................... 156/251; 156/265; 156/290; 156/300; 156/308.4; 156/515; 156/522; 156/530; 156/560
(58) Field of Search ................... 156/265, 251, 156/256, 269, 290, 292, 301, 308.4, 309.9, 530, 518, 522, 560, 300, 303, 519, 525, 515, 302

(56) References Cited

U.S. PATENT DOCUMENTS

| | | | | |
|---|---|---|---|---|
| 2,568,152 A | * | 9/1951 | Hermann | 83/690 |
| 3,384,528 A | * | 5/1968 | Lehmacher et al. | 156/515 |
| 3,614,383 A | * | 10/1971 | Watts | 219/243 |
| 3,708,349 A | * | 1/1973 | Macaulay et al. | 136/175 |

* cited by examiner

Primary Examiner—Linda Gray
(74) Attorney, Agent, or Firm—Greenblum & Bernstein, P.L.C.

(57) ABSTRACT

A sheet separator is so arranged as to cover both surfaces of an electrode plate, and a heating plate is applied along a to-be-bonded edge of the separator, thereby achieving bonding by thermal welding. The heating plate has a width corresponding to a width of a bonded portion of the separator. Then, by pressing a protrusion of the heating plate or a heating plate for cutting against substantially the central part of the bonded portion, local heat transfer takes place to sublime a resin component, whereby the separator is cut off. Thereupon, the pouch-shaped separator is attached to the electrode plate.

4 Claims, 2 Drawing Sheets

METHOD AND APPARATUS FOR ATTACHING SEPARATOR TO ELECTRODE PLATE

The present disclosure relates to subject matter contained in priority Japanese Patent Application No. 2001-61790, filed on Mar. 6, 2001, the contents of which is herein expressly incorporated by reference in its entirety.

BACKGROUND OF THE INVENTION

1. Field of the Invention

The present invention relates to a method and apparatus for attaching a pouch-shaped separator to an electrode plate of a battery.

2. Description of Related Art

A prismatic battery is constituted by placing an electrode plate group and an electrolyte in a battery case. The electrode plate group is composed of a plurality of square negative and positive electrode plates that are alternately superimposed one upon another with a separator interposed therebetween. In connection with this, as a method for inserting a separator between negative and positive electrode plates, there is known a technique whereby negative and positive electrode plates are alternately superimposed one upon another under a state where a pouch-shaped separator is attached to the positive or negative electrode plate.

An example of methods for attaching a pouch-shaped separator to an electrode plate will be described below. Firstly, as shown in FIG. 6A, a sheet-like separator 2 is so arranged as to cover both surfaces of an electrode plate 1. Subsequently, as shown in FIG. 6B, an ultrasonic bonding tool 31 is applied to a to-be-bonded edge of the separator 2. The ultrasonic bonding tool 31 has a width which is so set as to correspond to a width of a bonded portion 3. Thereby, the separator 2 receives, while being pressurized, ultrasonic vibration in a direction of a sheet surface thereof so as to be ultrasonically bonded. Lastly, as shown in FIG. 6C, a cutter 32 is applied to the central part of the bonded portion 3 to cut off the separator 2. In this way, the electrode plates 1 to which the pouch-shaped separator 2 is attached are consecutively produced.

In the conventional separator attaching method, the separator 2 made of a synthetic resin fiber cloth is subjected to ultrasonic bonding. However, in order for a fibrous material to be melted down by frictional heat resulting from ultrasonic vibration, application of ultrasonic vibration of large amplitude is required. This leads not only to an undesirable increase in running cost but also to the following problems. During bonding process, ultrasonic vibration is transmitted to the electrode plate 1. This causes active substances to fall off from the electrode plate 1, resulting in occurrence of minute short circuiting. Furthermore, whenever the cutter 32 is used to cut the bonded portion 3, a resin component contained in the separator 2 adheres to the blade of the cutter 32. This degrades the cutting capability of the cutter 32 in a short period of time and thus shortens its service life. Consequently, the amount of indirect materials tends to increase, and frequent halts of operations for cutter replacement are inevitable. This is undesirable from a cost standpoint.

SUMMARY OF THE INVENTION

The present invention has been made in light of the above stated problems with the conventional art, and accordingly it is an object of the present invention to provide a method and apparatus for attaching a separator to an electrode plate, the method and apparatus being free from a fear of minute short circuiting caused by the falling off of active substances from an electrode plate during the time a separator is shaped like a pouch by bonding, the method and apparatus being capable of cutting a bonded portion stably for a longer period of time without tool replacement, and requiring lower cost.

To achieve the above object, according to one aspect of the present invention, a method for attaching a separator to an electrode plate includes: a separator arrangement step for arranging a sheet-like separator so as to cover both surfaces of an electrode plate; a separator bonding step for thermally welding the separator by applying a first heating plate along a to-be-bonded edge of the separator adjacent to the electrode plate, the first heating plate having a width which is so set as to correspond to a width of a bonded portion of the separator; and a cutting step for cutting off the separator by pressing a second heating plate against substantially a central part of the bonded portion. In this method, since bonding of the separator is performed by thermal welding, no vibration occurs. This prevents active substances from falling off from the electrode plate, and thus prevents the possibility of minute short circuiting. Moreover, the separator is cut off by subliming its resin component through local heat transfer with use of a heating plate. Thus, cutting of the bonded portion is stably performed for a longer period of time without tool replacement, resulting in cost reduction.

According to another aspect of the invention, an apparatus for attaching a separator to an electrode plate, the apparatus that bonds a to-be-bonded edge, adjoining an electrode plate, of a separator which is so arranged as to cover both surfaces of the electrode plate and that cuts a central part of a bonded portion of the separator, includes: a bonding and cutting member composed of a heating plate with a width which is so set as to correspond to a width of the bonded portion, and having a cutting protrusion formed in one part thereof facing substantially the central part of the bonded portion. With this construction, bonding is performed without causing minute short circuiting, and further cutting of the bonded portion is stably performed for a longer period of time without tool replacement, which results in cost reduction. In addition, bonding and cutting are performed in combination in one process. This helps reduce the number of assembly man-hours, so that the cost is reduced greatly.

According to still another aspect of the invention, an apparatus for attaching a separator to an electrode plate, the apparatus that bonds a to-be-bonded edge, adjoining an electrode plate, of a separator which is so arranged as to cover both surfaces of the electrode plate and that cuts a central part of a bonded portion of the separator, includes: a heating plate for bonding having a width which is so set as to correspond to a width of the bonded portion; and a heating plate for cutting that cuts substantially the central part of the bonded portion.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS (First Embodiment)

Figure 6A:
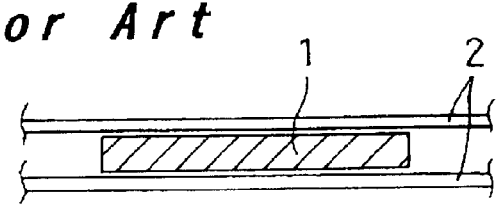
FIGS. 6A, 6B, and 6C are longitudinal sectional front views showing a conventional separator attaching process.
Figure 6B:
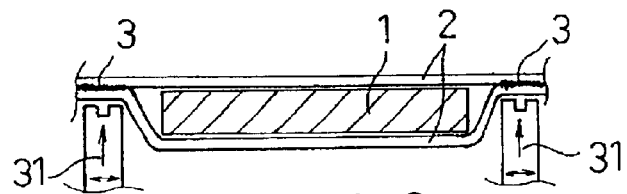
Figure 6C:
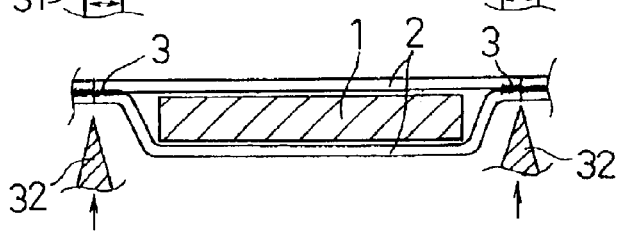

Hereinafter, with reference to FIGS. 1 and 2, a first embodiment of the method and apparatus for attaching a separator to an electrode plate according to the present invention will be described. Note that, in the first embodiment, the process for attaching a separator 2 to an electrode plate 1 is basically the same as that of the conventional example described with reference to FIGS. 6A to 6C, except the bonding and cutting process. Thus, in the following description, the components that play the same or corresponding roles as in the conventional example will be identified with the same reference symbols, and overlapping descriptions will be omitted.

Figure 1:
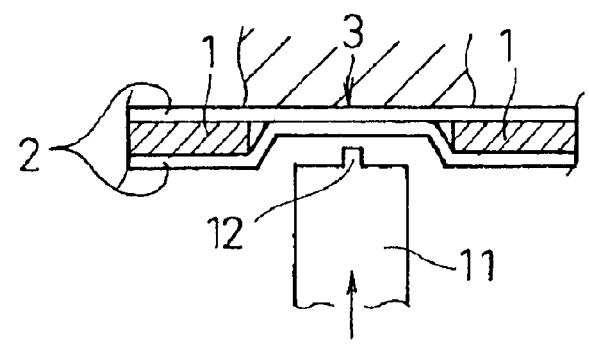
FIG. 1 is a longitudinal sectional front view showing a separator attaching process according to a first embodiment of the present invention.

As shown in FIG. 1, in the first embodiment, both of bonding and cutting of the separator 2 is performed by a single-unit heating plate 11. The heating plate 11, serving as a bonding and cutting member, has a width which is so set as to correspond to a width of a bonded portion of the separator 2, and has a cutting protrusion 12 formed in substantially the central part thereof. As a material used for the heating plate 11, aluminum or aluminum alloy is preferable, because these materials are excellent in thermal conduction. Further, from the viewpoint of service life, high-strength duralumin-base metal is most desirable. The heating plate 11 has, for example, such a configuration that the protrusion 12 is 0.2 mm in width and 0.2 mm in height; the shoulder portions on both sides of the protrusion 12 is each 0.6 mm in width; and the entire width is 1.4 mm.

In the foregoing construction, by pressing the heating plate 11 along a to-be-bonded edge of the separator 2, the separator 2 is thermally welded to be bonded. Then, the protrusion 12 locally transfers heat to the central part of the bonded portion 3 to sublime a resin component contained in the separator 2, so that the separator 2 is cut off.

In this way, since bonding of the separator 2 is performed by thermal welding, no vibration occurs. This prevents active substances from falling off from the electrode plate, and thus prevents the possibility of minute short circuiting. Moreover, since the separator 2 is cut off by the heating plate 11, cutting of the bonded portion 3 is stably performed for a longer period of time without tool replacement, which results in cost reduction. Further, bonding and cutting are performed in combination in one process. This helps reduce the number of assembly man-hours, so that the cost is reduced greatly.

Figure 2:
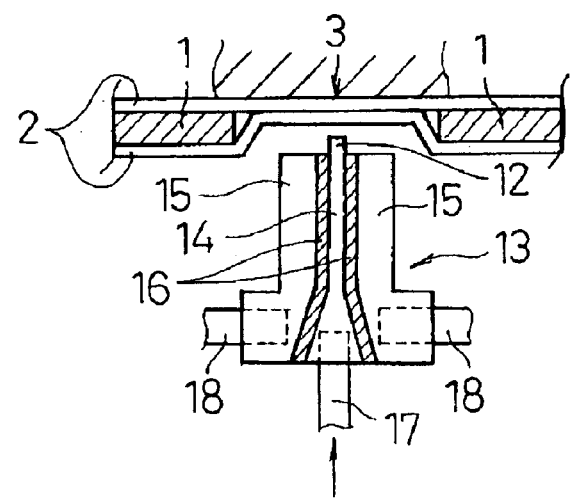
FIG. 2 is a longitudinal sectional front view showing another bonding and cutting member employed in the first embodiment.

While in FIG. 1, an example is shown in which the heating plate 11 consisting of a single member is employed, using a heating plate 13 shown in FIG. 2 as a bonding and cutting member may also be preferable. The heating plate 13 is composed of a heating plate for cutting 14 with a cutting protrusion 12 and heating plates for bonding 15, arranged on both sides of the heating plate 14, that are formed integrally with one another via a heat insulating material 16. In this heating plate 13, the heating plate for cutting 14 and the heating plate for bonding 15 may be individually heated by their respective heaters 17 and 18. As the heat insulating material 16, asbestos or foam glass is suitably used. The former is excellent in heat resistance and has sufficiently high maximum allowable working temperature (ranging from 400 to 600 degrees centigrade), and the latter exhibits lower thermal conductivity.

In such a heating plate 13, the temperature settings of the heating plate for cutting 14 and the heating plate for bonding 15 are individually made by the heaters 17 and 18. This facilitates performing bonding and cutting properly in a single process.

(Second Embodiment)

Figure 3A:
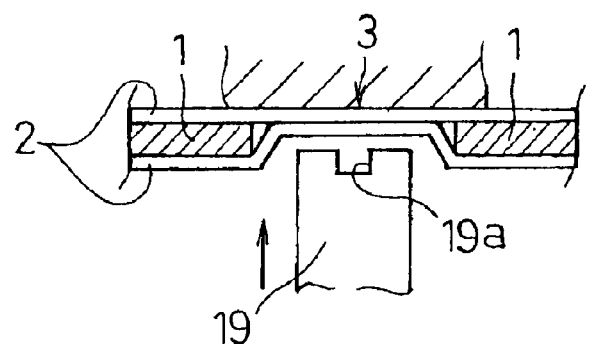
FIGS. 3A and 3B are longitudinal sectional front views showing the separator attaching process according to a second embodiment of the present invention.
Figure 3B:
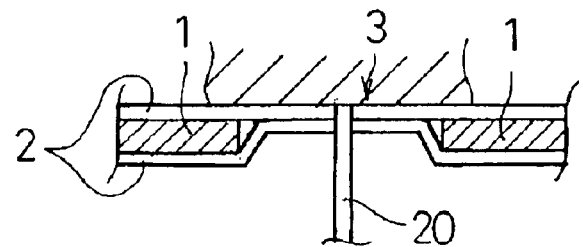

While the first embodiment deals with the case where bonding and cutting are performed in combination in one process by a single-unit heating plate (11 or 13), as shown in FIGS. 3A and 3B, bonding and cutting may also be separately performed with use of a heating plate for bonding 19 and a heating plate for cutting 20. In this case, the operation is made in two steps. In the first process shown in FIG. 3A, the separator 2 is subjected to bonding by the heating plate for bonding 19 to form a bonded portion 3. Then, in the second process shown in FIG. 3B, the central part of the bonded portion 3 is subjected to cutting by the heating plate for cutting 20.

The heating plate for bonding 19 has a width which is so set as to correspond to a width of the bonded portion 3 (1.4 mm, for example), and has, in the widthwise central position on its front-end surface, a concave groove 19a for securing contact surface pressure. A temperature of the heating plate for bonding 19 is, though it varies according to the thermal conductivity of the heating plate material or the material of the separator 2, preferably set to a range of 200 to 240 degrees centigrade. If the setting temperature is too low, the resin component cannot be melted sufficiently, causing imperfect welding and/or reduction in the bonding strength. By contrast, if the setting temperature is too high, the resin component is melted thoroughly, with the result that the welded surface may become lost, or part of the separator 2 adjacent to the bonded portion 3 may be cut off by radiant heat emitted from the heating plate. Moreover, it is preferable that a pressing force of the heating plate for bonding 19 be set to a range of ca. 2.8 to 4.2 Mpa in terms of surface pressure, and that duration of time that the separator 2 is being pressed be set at ca. 0.6 sec. In this embodiment, bonding is performed under the following conditions: setting temperature: 240° C.; pressing force: 4.2 Mpa; and pressing time duration: 0.6 sec.

The heating plate for cutting 20 is 0.2 mm in width dimension and its temperature is, though it varies according to the thermal conductivity of the heating plate material or the material of the separator 2, preferably set to a range of ca. 300 to 340 degrees centigrade. Moreover, a pressing force of the heating plate for cutting 20 should preferably be set to a range of ca. 4.2 to 4.9 Mpa in terms of surface pressure. In this embodiment, cutting is performed under the following conditions: setting temperature: 310° C.; pressing force: 4.9 Mpa; and pressing time duration: 0.2 sec.

(Third Embodiment)

Figure 4:
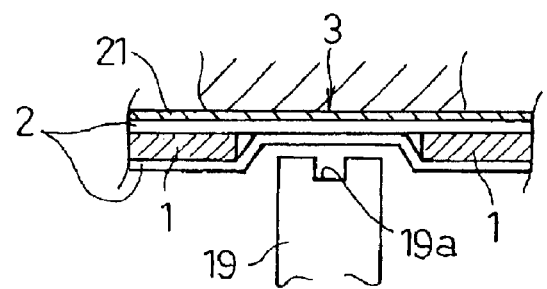
FIG. 4 is a longitudinal sectional front view showing a separator bonding process according to a third embodiment of the present invention.

While the second embodiment deals with the case where the separator 2 is supported simply at its back face, as shown in FIG. 4, it is also preferable that the separator 2 be supported at its back face via a cushioning member 21 made of, for example, a tape material having high heat resistance.

This arrangement allows the separator 2 to make good contact with the heating plate for bonding 19, so that the quality of the bonded portion 3 improves.

While in this description, an example is shown in which the cushioning member 21 is used in the bonding process performed by the heating plate for bonding 19 of the third embodiment, the cushioning member 21 may also be used in the bonding/cutting process performed by the heating plate 11 of the first embodiment or the heating plate 13 of the second embodiment. In these cases, by supporting the separator 2 via the cushioning member 21 in a similar manner, substantially the same effect is attained.

(Fourth Embodiment)

In the bonding process according to the second embodiment, the heating plate for bonding 19 and the separator 2 make direct contact with each other. Alternatively, as shown in FIG. 5, it is also preferable that a protective tape 22 having high heat resistance be interposed between the heating plate for bonding 19 and the separator 2.

Figure 5:
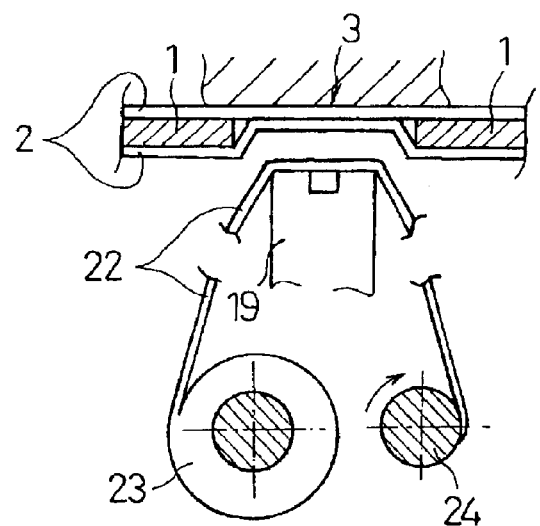
FIG. 5 is a longitudinal sectional front view showing the separator bonding process according to a-fourth embodiment of the present invention.

In FIG. 5, the protective tape 22 is wound on a supply reel 23 which is so designed as to pay out the protective tape 22 under a certain tension. The protective tape 22 unreeled from the supply reel 23 is, through the front-end surface of the heating plate for bonding 19, wound up on a take-up reel 24 by a motor (not shown). The protective tape 22 is taken up by the take-up reel 24 by several millimeters at regular intervals.

In this way, the protective tape 22 is interposed between the heating plate for bonding 19 and the separator 2, and the protective tape 22 is moved at regular intervals so as for its fresh surfaces to be used for bonding operations at all times. This arrangement prevents degradation in the quality of the bonded portion 3 caused by the adhesion of a burnt or melted residue of the separator 2 to the front-end surface of the heating plate 19 due to the repetition of thermal welding, eliminates the need to clean the surface of the heating plate 19 on a regular basis, and improves the capacity utilization ratio.

In the method and apparatus for attaching a separator to an electrode plate according to the present invention, since bonding of a separator is performed by thermal welding and cutting is performed by pressing a heating plate against substantially a central part of the bonded portion of the separator, no vibration occurs. This prevents active substances from falling off from the electrode plate and thus prevents the possibility of minute short circuiting. Moreover, the separator is cut off by subliming its resin component through local transfer of heat carried out by a heating plate. Consequently, cutting of the bonded portion is stably performed for a longer period of time without tool replacement, which results in cost reduction.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for attaching a separator to an electrode plate, comprising:

arranging a sheet-shaped separator so as to cover both surfaces of an electrode plate;

thermally welding the separator by applying a first heating plate along a to-be-bonded edge of the separator adjacent to the electrode plate, the first heating plate having a width which is so set as to correspond to a width of a bonded portion of the separator; and cutting off the separator by pressing a second heating plate against substantially a central part of the bonded portion, wherein the separator is made of a fiber cloth comprising a resin component which sublimes during cutting with heating.

2. The method for attaching a separator to an electrode plate according to claim 1, wherein the thermally welding and the cutting are performed in combination in one process by use of a single-unit heating plate having a protrusion that cuts the separator, and the single-unit heating plate serves as the first and second heating plates in common.

3. The method for attaching a separator to an electrode plate according to claim 1, wherein, at least in the thermally welding, the separator is supported, via a cushioning member, at one surface opposite to its first heating plate side surface.

4. The method for attaching a separator to an electrode plate according to claim 1, wherein, in the thermally welding, a protective sheet is interposed between the first heating plate and the separator.

* * * * *